Figure 1A:
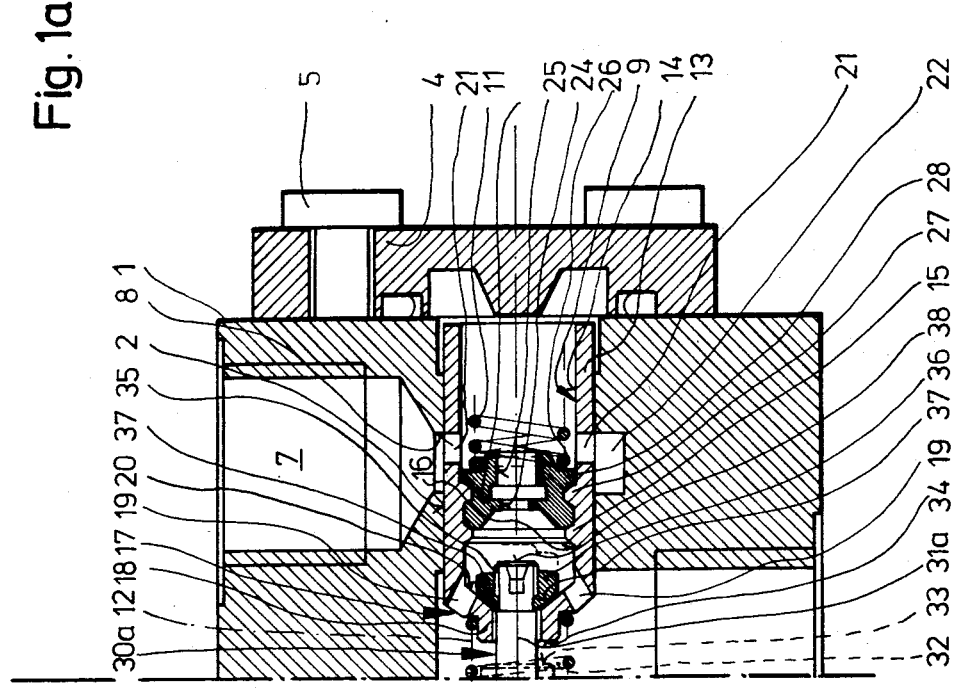

United States Patent [19]

Brunner

[11] Patent Number: 4,495,961
[45] Date of Patent: Jan. 29, 1985

[54] FLOW DIVIDER

[75] Inventor: Rudolf Brunner, Baldham, Fed. Rep. of Germany

[73] Assignee: Heilmeier & Weinlein, Fabrik fur Oel-Hydraulik GmbH & Co., KG, Munich, Fed. Rep. of Germany

[21] Appl. No.: 465,805

[22] Filed: Feb. 11, 1983

[30] Foreign Application Priority Data

Feb. 16, 1982 [DE] Fed. Rep. of Germany ....... 3205368

[51] Int. Cl.$^3$ .............................. G05D 11/02
[52] U.S. Cl. .................... 137/101; 137/118; 251/86; 403/56
[58] Field of Search ........... 137/101, 118, 513; 251/86; 91/514, 516, 532; 60/422; 403/56, 122, 133, 90

[56] References Cited

U.S. PATENT DOCUMENTS

| 3,197,552 | 7/1965 | Flair | 403/56 X |
| 3,198,203 | 8/1965 | Margida | 251/86 X |
| 3,481,489 | 12/1969 | Stauffer | 91/515 X |
| 3,722,524 | 3/1973 | Engelmann | 137/118 X |
| 3,842,187 | 10/1974 | Barkan | 403/56 X |
| 3,955,473 | 5/1976 | Oxley et al. | 137/101 X |
| 4,114,851 | 9/1978 | Shivak et al. | 251/88 |

FOREIGN PATENT DOCUMENTS 785179 10/1957 United Kingdom ................ 137/118

Primary Examiner—Martin P. Schwadron
Assistant Examiner—Stephen M. Hepperle
Attorney, Agent, or Firm—Kinzer, Plyer, Dorn & McEachran

[57] ABSTRACT

The present invention relates to a flow divider for carrying out a load-independent division of a stream of hydraulic fluid, comprising a basic body including an internal bore, a central main connection and two outer consumer connections leading to said internal bore, and further comprising two approximately coaxial control pistons which are displaceably guided in said internal bore and which are each provided with a flow orifice and with at least one radial control opening, said control pistons being adapted to be moved towards each other and away from each other to a limited extent via a coupling device connecting said pistons. In the case of known flow dividers the coupling device consists of interengaging hooks which are rigidly formed on the control pistons, said hooks producing, however, eccentric forces for the control pistons in said internal bore, and said forces impair the control characteristics and the operating behaviour of the flow divider. The task is the provision of a flow divider in the case of which the control pistons can be displaced without any clamping forces being produced. In accordance with the invention, this task is solved by the feature that the support areas between the coupling device and the control pistons have a structural design similar to that of a ball and socket joint.

15 Claims, 2 Drawing Figures

FLOW DIVIDER

The publication U.S. Pat. No. 3,481,489 discloses a flow divider having the above-mentioned structural design. For establishing a positive connection, both control pistons have provided thereon a hooklike extension formed integrally with said control pistons. The hooklike extensions engage each other such that one one locks into and behind the other. When the control pistons have been moved away from each other up to the final positions limited by the extensions, the hook-engaging extensions produce eccentrically directed forces at the control pistons, which has the effect that said control pistons tends to jam in the internal bore. Eccentric forces, which cause the control pistons to tilt in the internal bore, also occur when the control pistons have been moved towards each other until the extensions abut on the end faces of said control pistons. Due to their structural design, the extensions will produce such eccentric forces even if the mutual contact areas are formed and machined extremely carefully. Such fow dividers have, however, the task of dividing streams of hydraulic fluid and of uniting said streams in the opposite direction of flow in an extremely sensitive and load-independent manner. The operating cycle of the control pistons is, however, impeded by these clamping forces and this exerts an influence on the flow divider characteristics. If, for example, the two grab halves of an excavator are controlled via a flow divider, jamming of the control pistons, which are connected to each other via the coupling device, will result in lagging or leading of one grab half relative to the other. An additional disadvantage of the known flow divider is to be seen in the more complicated and more expensive production of the control pistons provided with hooklike extensions.

In the case of a flow divider of the same type, which is known from German-Offenlegungschrift No. 24 46 802, FIG. 4, two different control pistons are combined, one of said control pistons having an extension with a T-shaped cross-section which engages a correspondingly formed transverse groove of the other control piston and defines together therewith the coupling device. By means of this coupling device the two control pistons are rigidly coupled in their two final positions, i.e. they form a rigid system under the influence of the tractive or pressure forces applied, in which system the two control pistons cannot carry out any displacement or angular movements in the respective support area. Since, however, in spite of extremely careful machining, minor displacements between the two sections of the internal bore or an angular displacement between the longitudinal axes of the internal bore sections cannot be avoided in practice and since such manufacturing inaccuracies are additionally aggravated by the pressure applied and by temperature or pressure influences, the two control pistons, which are rigidly coupled with each other in the manner described hereinbefore, will again tend to jam in the internal bores when they have to carry out their operating cycle motion. In this connection it must be specially emphasized that such flow dividers operate under extremely high pressures from which high relative forces result. The control pistons must, however, slide very smoothly in the internal bore sections, and this, as experience has shown, cannot be achieved, since these two control pistons take up a considerable length within the internal bore.

Furthermore, U.S. Pat No. 3,722,524 discloses a flow divider of a different type, in the case of which the two control pistons are guided within their respective internal bore sections such that they are secured against rotation and in the case of which said control pistons are each provided with an inclined surface on their respective end faces facing each other. Via these inclined surfaces the control pistons abut on a spherical flow throttle member which is adapted to be adjusted transversely to the longitudinal axis of the internal bore. The respective distance between the control pistons can be varied by adjusting this member. The device in question is in this case not a coupling device, but a spreading device. If the two control pistons have applied fluid thereto from the side of the throttle member, they are not coupled with each other and, consequently, they cannot carry out any synchronous motion, said type of motion being required in the case of a flow divider. Only in the reverse direction of fluid application, viz. in the direction towards the throttle member, the control pistons are coupled with each other via said throttle member and can carry out an operating cycle movement by means of wich they fulfil the function of a flow divider. In addition to the fact that, due to the anti-rotation protection of the control pistons, frictional forces which are necessary for said anti-rotation protection and which deteriorate the control behaviour are unavoidable, the last-mentioned mode of fluid application has the effect that by means of the pressure contact between the inclined end faces and the spherical surface of the throttle member a strong clamping force for the control piston in the internal bore section is produced, said clamping force corresponding to approximately half the axial pressure force and being produced for each control piston so that the control behaviour is extraordinarily poor in the case of this mode of fluid application. The reaction force, which is effective at the spherical throttle member and which is caused by the measure of pressing the two control pistons against said throttle member, presses said member onto its support surface so that in this area, too, high friction will occur, which interferes with the control behaviour of the flow divider in the case of the last-mentioned mode of fluid application.

The invention is based on the task of providing a flow divider of the type mentioned at the beginning, which cannot only be produced in a less difficult manner than the known one, but which is also characterized by perfect control characteristics due to the total absence of any clamping forces at the control pistons.

In accordance with the invention, the posed task is solved by having each control piston resting on the coupling device after the fashion of a ball and socket joint and this avoids the generation of eccentric reaction forces which would then cause jamming of the control pistons in the internal bore. In the case of this type of connection it is even possible to compensate for minor axial displacements between the control pistons. Although in the final positions the connection is rigid in the tension and pressure directions of both control pistons, relative lateral movability and self-centering are maintained. This structural design results in a perfect control behaviour of the flow divider, since the operating cycle of the two control pistons is not influenced by any clamping forces.

An additional expedient embodiment of the invention is one in which a structural design similar to that of a ball and socket joint is provided in the case of both final relative positions of the control pistons, said support means preventing the generation of clamping forces and having even the effect that radial displacements or inaccuracies arising from the manufacturing process and affecting the control piston guidance are compensated for.

An additional embodiment is achieved by low technical expenditure. Instead of the two hooklike extensions cooperating / in the case of the prior art, said embodiment provides only one continuous element, which cooperates with the control pistons to form the connection portions having a structural design similar to that of a ball and socket joint. It is obvious that this element can be provided coaxially with the two control pistons so that any eccentric reaction forces are avoided and that only force components extending exactly in the axial direction occur.

Another embodiment is one in which the control pistons are simple to manufacture. Furthermore, the assembly of the flow divider is no problem at all. The reaction forces between the coupling device and the control pistons are distributed uniformly and over a large area even in the case of high operating pressures.

For reasons of production technology, it is furthermore expedient to provide conical support surfaces in the control pistons.

Although the measure of designing the coupling device in such a way that, in the case of moved-apart control pistons, it operates with support means having a structural design similar to that of a ball and socket joint, is sufficient for obtaining a perfect control behavior, it is also necessary to take care that, when the control pistons have been moved towards each other, said control pistons are perfectly centered and aligned with each other, without any clamping forces being produced. This can be effected in the case where the control pistons either rest on and are centered on the contact surfaces of the collar, or where said control pistons rest directly on each other via the end faces of the annular flanges and are centered on each other.

An expedient embodiment is to employ a ball and socket joint having the effect that radial displacements or inaccuracies arising from the manufacturing process are compensated for.

The invention also provides for the possibility of changing over to a different flow rate is to exchange the flow orifices in the control pistons.

Springs though not necessary for the operation of the flow divider, assure that the control piston occupies an initial position after a complete pressure reduction or rather that the control characteristic of the flow divider starts within a predetermined initial range.

A central spring between the two control pistons will assure that they will be centered perfectly.

Another object is to relay on a particular area of the control pistons where there exists sufficient space for providing generous flow passages which cannot cause a noticeable drop of pressure, not even in the case of a high flow rate.

Figure 1B:
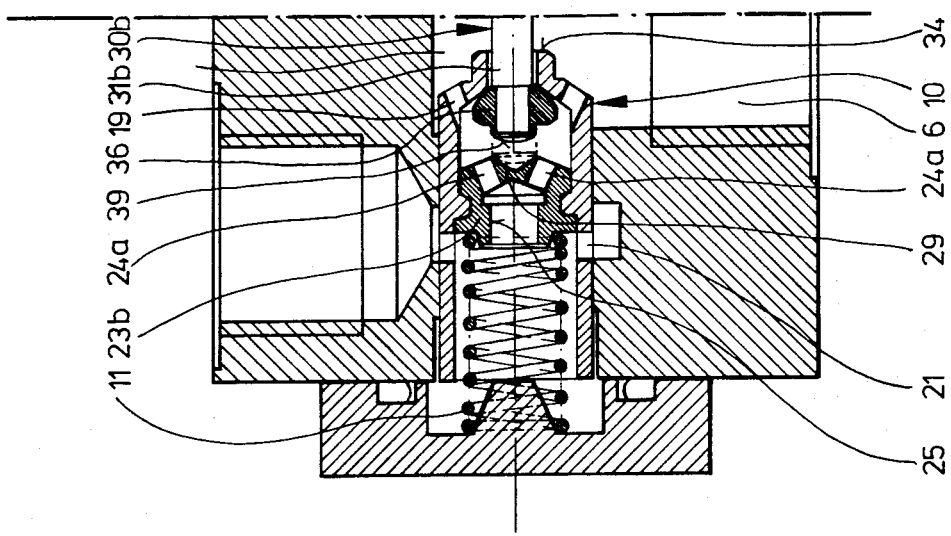

In the following, two embodiments of the subject matter of the invention will be explained on the basis of the drawings, in which FIG. 1a shows the right half of a first embodiment of a flow divider in a longitudinal section, the other half being identical and FIG. 1b shows the left half of a second embodiment of a flow divider in which the other half is identical.

The flow divider for carrying out a load-independent division of a stream of hydraulic fluid and for carrying out a load-independent combination of two streams of hydraulic fluid to form a single stream of hydraulic fluid consists of a rectangular basic body 1 comprising an internal bore 2 which extends therethrough in the longitudinal direction and which is subdivided into two bore sections by a central annular section 3. The internal bore is closed at both ends thereof by respective covers 4 which are secured in position on the body 1 by means of screws 5. A main connection 6 terminates in the central annular section 3 of the internal bore 2, whereas oppositely disposed consumer connections 7, laterally displaced symmetrically with respect to the main connection, terminate via narrowed apertures 8 in the internal bore 2.

In the internal bore 2 two identical control pistons 9 or 10 are provided in a mirror-image arrangement and are displaceably guided, said control pistons being acted upon in a direction towards each other by compression springs 11 resting on said covers 4 and in a direction away from each other by an intermediately disposed compression spring 12.

The control pistons 9, 10 of the two embodiments (FIG. 1a, 1b) are provided with a hollow cylindrical jacket 13 including an internal bore 14 and an internal thread section 15 which leads to a front section 16 of the bore. The control piston ends 17 facing each other are reduced in size after the fashion of a funnel up to an annular flange 18. In the end 17 flow passages 19, which are directed inwards at an oblique angle, extend in such a way that they lead to the interior of the control pistons 9, 10. The end 17 has provided in the interior thereof a conical support surface 20.

The jacket 13 has provided therein radial control openings 21 leading to an annular space 22 and to the apertures 8 of the consumer connections 7, respectively. In the drawing the full cross-section of the control openings 21 leading to the consumer connections 7 is free. It is obvious that the flow cross-section through the control openings 21 is reduced to a certain extent, when the control pistons 9 and 10, respectively, are moved to the left or to the right away from the position shown in the drawing.

A flow orifice element (23a), having an orifice aperture 24 of a predetermined size as well as a screw-in opening 25 for applying a screw tool, which is not shown, is screwed into the internal thread section 15 of the control piston 9 of the embodiment of FIG. 1a. At the flow orifice end facing the spring 11 a spring seat 26 is provided. A shoulder 28 of the flow orifice 23a abuts on a shoulder 27 at the beginning of the internal thread section 15.

The control pistons 9 of the embodiment according to FIG. 1a are connected via a coupling device 30a in such a way that they are capable of carrying out longitudinal movements in the internal bore 2 in common in the case of both final positions and in such a way that they are capable of carrying out longitudinal movements relative to each other in said internal bore 2 in the case of all intermediate positions and within a range limited by the coupling device 30a.

The coupling device 30a consists of a cylindrical shaft 31a which, in the case of the embodiment according to FIG. 1a, is provided with a circumferentially extending collar 32 at the centre of its longitudinal extension, said collar being provided with contact surfaces 33. Corresponding contact surfaces 34 are also provided on the annular flanges 18 of the control pistons.

Both ends of the shaft 31a are provided with an external thread section 35, each of said external thread sections having screwed thereon a tension member, in this case a hexagonal nut. The tension member 36 is provided with a convex bearing surface 37, which faces the support surface 20. The free ends of the shaft 31a, which are referred to by reference numeral 38, are flattened.

The mode of operation of a flow divider is known so that it will be sufficient to mention that, when pressure is applied from the main connection 6, the two control pistons will move away from each other until they are stopped by the coupling device 30a in one of their end positions. The actual operating cycle of the rigidly coupled control pistons is caused by the difference of pressure between the orifice apertures and the control openings of both control pistons. A condition of equilibrium is always established so that the same amounts of fluid flow in both connections 7. The control is effected by an intersection of the control openings 21 and of the apertures 8 in such a way that each consumer connection 7 is supplied with a predetermined stream of oil in a load-independent manner. For this purpose, the control pistons move back and forth in the internal bore 2 in response to the pressure conditions in the consumer connections 7.

As soon as the sub-streams coming from the consumer connections 7 are combined and are to be discharged through the main connection 6, the two control pistons 9 and 10 first slide towards each other until, in the case of the embodiment according to FIG. 1a, their contact surfaces 34 abut on the collar 32 and the pistons are rigidly coupled with each other. Then another operating cycle occurs so that the streams of oil coming from the consumer connections are combined in a load-independent manner.

When the control pistons have been moved away from each other up to the final positions, the tractive forces are transmitted from the support surfaces 20 to the bearing surfaces 37 and into the coupling device 30a, the transmission areas having a structural design similar to that of a ball and socket joint, that is, the opposed areas are, respectively, substantially complemental convex and concave areas. This structural design avoids eccentric reaction forces at the control pistons and, if necessary, inaccuracies arising from the manufacturing process, e.g. control piston axes which are not exactly aligned or deviations from a straight internal bore extension, are also compensated for by this structural design. In view of the fact that the reaction forces between the coupling device 30a and the control pistons 9 and 10 occur such that they are uniformly distributed about the continuous longitudinal axis, eccentric or oblique forces cannot be produced in this case either. This is also true if, in the other final position, the contact surfaces 34 abut on the collar 32, since in this case, too, an exactly centrical support exists.

The difference between the above-described embodiment and the embodiment of FIG. 1b is to be seen in the fact that, when the control pistons of the last-mentioned embodiment have been moved away from each other up to their final positions, a support means having a structural design which is similar to that of a ball and socket joint is provided between the tension members 36 and the ends 17 of the control pistons 10 and that, in addition, a support means having a structural design which is similar to that of a ball and socket joint is also provided when the control pistons have been moved towards each other up to their other final position. For this purpose, the control pistons 10 have inserted therein flow orifices 23b with outwardly displaced orifice apertures 24a. Between the orifice apertures 24a a conical support surface 29 is provided on the front of each flow orifice 23b, said conical support surface 29 being aligned with the spherical or convex end 39 of the shaft 31b of the coupling device 30b of said embodiment.

It is obvious that, in the case of the embodiment of FIG. 1b, a collar 32 on the shaft can be dispensed with, since, when the control pistons 9 have been moved towards each other, the the convex ends 39 abut on the conical support surfaces 29 before the annular flanges 18 have any possibility of contacting each other. It would also be possible to provide one control piston with a centrical, lengthened shaft which projects into the other control piston and which is there supported in both final positions by support means having a structural design similar to that of a ball and socket joint.

I claim:

1. A flow divider for carrying out a load-independent division of a stream of hydraulic fluid, comprising a basic body including an internal bore, a central main connection and two outer consumer connections leading to said internal bore and further comprising two approximately coaxial control pistons (9, 10) wich are displaceably guided in said internal bore and which are each provided with a flow orifice and with at least one radial control opening, said control pistons being connected by a coupling device such that they can be moved towards each other and away from each other to a limited extent, characterized in that the support areas between the coupling device (30a, 30b) and the two control pistons are, respectively, substantially complemental concave and convex support areas, and further characterized in that the coupling device (30a) is an element (31a) which engages both control pistons and which, adjacent each respective free end thereof, is designed as a ball and socket joint part in combination with the respective control piston.

2. A flow divider according to claim 1, characterized in that the element (31a) is a cylindrical shaft which has an outer diameter substantially smaller than the interior diameter of the control pistons (9, 10) and which, adjacent each of the free ends thereof, is provided with a headlike member (36) with a bearing surface (37), that the bearing surfaces (37) of both members (36) face each other, that the headlike member receiving end (17) of each control piston (9) is reduced in size to form an annular flange (18) guiding the shaft and that each control piston is provided on the inner side thereof with a support surface (20) for the bearing surface (37), and that either the bearing surfaces (37) or the support surfaces (20) have a spherical configuration.

3. A flow divider according to claim 2, characterized in that the bearing surfaces (37) have a spherical configuration and that the support surfaces (20) have a conical configuration.

4. A flow divider according to claim 3, characterized in that the member (36) is a nut screwed on the shaft (31a) and which is convex on one side thereof for forming the bearing surface (37).

5. A flow divider according to claim 4, characterized in that, at the centre of its longitudinal extension, the shaft (31a) is provided with a collar (32) with contact surfaces (33) for the annular flanges (18) and the ends (17) of both control sleeves (9, 10), respectively.

6. A flow divider according to claim 4, characterized in that, for establishing a mutual, direct contact, contact surfaces (34) extending at right angles to the longitudinal axis of the bore are provided at the oppositely disposed end faces of the annular flanges (18).

7. A flow divider according to claim 4, characterized in that the free ends (39) of the shaft (31b) have a spherical configuration, and that a conical support surface (29) for a shaft end is provided in the interior of each control piston (10).

8. A flow divider according to claim 7, characterized in that a flow orifice (23a, 23b) having a orifice aperture size is displaceably inserted in each control piston (9, 10) such that it can be exchanged.

9. A flow divider according to claim 8, characterized in that the flow orifices are presented by elements (23a, 23b) screwed into the control pistons.

10. A flow divider according to claim 8, characterized in that the flow orifice elements (23a, 23b) are provided with openings (25) for applying a screw tool.

11. A flow divider according to claim 7, characterized in that each flow orifice element (23b) has the support surface (29) for the shaft end (39) provided on the side thereof facing the shaft (31b).

12. A flow divider according to claim 11, characterized in that the control pistons (9, 10) are acted upon in a direction towards each other by springs resting on the flow orifice elements (23a, 23b) and in a direction away from each other by an additional spring (12) surrounding the shaft (31a, 31b).

13. A flow divider according to claim 12, characterized in that each annular flange (18) defines a seat for the spring (12).

14. A flow divider according to claim 13, characterized in that at least one flow passage (19) is provided in a funnel-shaped end (17) of each control piston (9, 10).

15. A flow divider according to claim 9, characterized in that the flow orifice elements (23a, 23b) are provided with openings (25) for applying a screw tool.

* * * * *